United States Patent [19]

Klump et al.

[11] Patent Number: 5,242,293
[45] Date of Patent: Sep. 7, 1993

[54] APPARATUS FOR PRODUCING AN EXTRUSION OF MATERIAL WITH A CENTRAL OPENING

[75] Inventors: Stefan Klump, Lichtenfels; Reinhard Fischbach, Berlin, both of Fed. Rep. of Germany

[73] Assignee: Siemens Aktiengesellschaft, Munich, Fed. Rep. of Germany

[21] Appl. No.: 810,699

[22] Filed: Dec. 19, 1991

[30] Foreign Application Priority Data

Dec. 19, 1990 [DE] Fed. Rep. of Germany ....... 4040733

[51] Int. Cl.⁵ .............................................. B29C 47/20
[52] U.S. Cl. .................... 425/461; 264/209.1; 425/466; 425/467
[58] Field of Search ............... 264/1.1, 1.2, 1.6, 176.1, 264/209.1, 209.8, 211.11; 425/380, 381, 382.4, 461, 466, 467, 468, DIG. 10

[56] References Cited

U.S. PATENT DOCUMENTS

| | | | |
|---|---|---|---|
| 1,248,963 | 12/1917 | Webber | 425/466 |
| 1,679,545 | 8/1928 | Roth | 425/230 |
| 3,079,634 | 3/1963 | Berger | 425/461 |
| 3,295,166 | 1/1967 | Owings | 425/380 |
| 3,343,214 | 9/1967 | Myers | 425/461 |
| 3,357,050 | 12/1967 | Criss | 425/461 |
| 3,764,253 | 10/1973 | Waterloo | 425/466 |
| 4,108,590 | 8/1978 | Kontz | 264/209.1 |
| 4,216,253 | 8/1980 | Bonnebat et al. | 264/209.1 |
| 4,240,782 | 12/1980 | McPhee et al. | 264/209.8 |
| 4,731,216 | 3/1988 | Topolski | 425/380 |
| 4,783,299 | 11/1988 | Prevotat | 264/209.8 |

FOREIGN PATENT DOCUMENTS

| | | |
|---|---|---|
| 0047839 | 3/1982 | European Pat. Off. . |
| 0098119 | 6/1986 | European Pat. Off. . |
| 0277619 | 8/1988 | European Pat. Off. ............ 425/461 |
| 686673 | 1/1940 | Fed. Rep. of Germany . |
| 831563 | 2/1952 | Fed. Rep. of Germany . |
| 961211 | 4/1957 | Fed. Rep. of Germany . |
| 1275280 | 8/1968 | Fed. Rep. of Germany . |
| 1299244 | 10/1969 | Fed. Rep. of Germany . |
| 1914255 | 10/1970 | Fed. Rep. of Germany . |
| 1629401 | 1/1971 | Fed. Rep. of Germany . |
| 1665805 | 9/1971 | Fed. Rep. of Germany ...... 425/380 |
| 2220320 | 11/1973 | Fed. Rep. of Germany . |
| 7403701 | 4/1974 | Fed. Rep. of Germany . |
| 2311815 | 9/1974 | Fed. Rep. of Germany . |
| 2518649 | 11/1976 | Fed. Rep. of Germany . |
| 2625786 | 12/1977 | Fed. Rep. of Germany . |
| 2639665 | 3/1978 | Fed. Rep. of Germany . |
| 60-189415 | 9/1985 | Japan ..................... 425/461 |
| 7001013 | 7/1970 | Netherlands ........... 425/467 |
| 889453 | 12/1981 | U.S.S.R. ................ 425/466 |
| 1020442 | 2/1966 | United Kingdom . |

*Primary Examiner*—Scott Bushey
*Attorney, Agent, or Firm*—Herbert L. Lerner; Laurence A. Greenberg

[57] ABSTRACT

An apparatus for producing extrusions, such as optical waveguide plug prongs or sheaths with a central opening, from a deformable composition, includes a receiving body having an outlet opening and having an interior tapering conically at a predetermined first angle of conicity toward the outlet opening. A flow body is to be inserted into the interior of the receiving body. The flow body has an end portion tapering conically at a predetermined second angle of conicity. The second angle of conicity is smaller than the first angle of conicity. A retainer retains the flow body in the interior of the receiving body. The retainer is resilient in radial direction of the interior of the receiving body.

22 Claims, 2 Drawing Sheets

APPARATUS FOR PRODUCING AN EXTRUSION OF MATERIAL WITH A CENTRAL OPENING

BACKGROUND OF THE INVENTION:

Field of the Invention:

The invention relates to an apparatus for producing an extrusion or billet having a central opening, from a deformable composition.

In many fields of work, there is a need for shorter or longer material extrusions with a central opening or longitudinal conduit, that is hollow-cylindrical bodies of material. After an insertion of an optical wave guide into the relatively narrow longitudinal conduit, such material extrusions are used as optical waveguide plug prongs or pins. In principle, sheaths or sockets for optical waveguides have the same structure, in that they are once again hollow cylindrical bodies. Such prong bodies and sheaths can be made by extrusion from a soft, deformable composition, such as a ceramic-like zirconium oxide. After the extrusion, care is taken to ensure that the composition will set and still maintain its hollow-cylindrical shape.

It is of paramount importance to ensure that the hollow-cylindrical bodies of material that are produced have good concentricity of the central conduit. Meeting that condition makes high demands of the tool used for the extrusion, particularly if the central conduit is supposed to be quite narrow. For instance, in the case of the aforementioned optical waveguide plug prongs or pins, hollow-cylindrical material extrusions having an outside diameter of 2.5 to 2.6 mm and a conduit diameter of only 80 to 100 $\mu$, are needed. The location of the conduit cannot be allowed to deviate by more than 15 to 30 $\mu$ (tolerance) from the geometric center. The situation is similar for optical waveguide sheaths or sockets, which, for example, should have an outside diameter of 4.0 mm and a conduit diameter of 2.5 mm. The tool should also be constructed in such a way that the soft composition does not collapse inward immediately after the extrusion process, which would cause the central conduit to "stick together". It would also be desirable for one and the same tool to be usable for producing material extrusions with central conduits of various diameters.

In principle, a tool could be constructed that operates out of an outlet opening with a mandrel disposed in front of it, during the extrusion of the material. However, in the case of especially small conduit diameters, the diameter of such a mandrel must be no greater than approximately the thickness of a hair. Experiments with a tool that is constructed in this way have shown that the central adjustment of the mandrel entails time-consuming work under the microscope. Moreover, problems arise particularly upon startup of operation, since the first time there is a flow toward the outlet opening, the composition flows unevenly along the mandrel, causing the mandrel to bend (resulting in a non-concentric longitudinal conduit) or even break off. In order to overcome that drawback, other experiments were made with a tool that used a rotating mandrel. In that case, however, it was found that the rotary speed had to be very high, for example 20,000 to 30,000 rpm, which necessitated an expensive drive mechanism. Moreover, the prong became hot during operation because of the friction with the deformable composition, with undesirable effects. Thus the tool must not only be adequately sturdy, but it must not impair the flow behavior of the flowing composition.

SUMMARY OF THE INVENTION:

It is accordingly an object of the invention to provide a relatively simply constructed apparatus for producing an extrusion with a central opening from a deformable composition, which overcomes the hereinafore-mentioned disadvantages of the heretofore-known devices of this general type, and with which it becomes possible to adhere to close tolerances in the concentricity of the central longitudinal conduit.

With the foregoing and other objects in view there is provided, in accordance with the invention, an apparatus for producing an extrusion with a central opening from a deformable composition, comprising a receiving body having an outlet opening and having an interior tapering conically at a predetermined first angle of conicity in the direction of the outlet opening; a flow body intended for insertion into the interior of the receiving body, the flow body having an end portion tapering conically at a predetermined second angle of conicity, the second angle of conicity being smaller than the first angle of conicity; and a retainer retaining the flow body in the interior of the receiving body, the retainer being slightly resilient, flexible or elastic in radial direction of the interior of the receiving body.

After the insertion, a tapering flow chamber, into which the flowable composition is pressed at increasing speed during the extrusion, is created between the conical interior of the receiving body and the end part of the flow body. Since the flow body is elastically suspended by means of the retainer, and an intrinsically homogeneous flowable composition is used, the flow body centers itself automatically. This means that adjustment under the microscope is unnecessary, and the apparatus is self-adjusting, which leads to a particularly close tolerance in terms of the concentricity of the longitudinal conduit formed in the extruded part.

In accordance with another feature of the invention, the flow body is axially adjustable relative to the receiving body.

To this end, in accordance with a further feature of the invention, the flow body is secured to the receiving body by at least one thread, such as by the retainer being provided with a screw means.

The size of the hole in the material extrusion can be adjusted by axially adjusting the flow body. In particular, in accordance with an added feature of the invention, there is provided a prong, preferably being formed of metal, being surrounded by the retainer, the prong having one end being screwed into the flow body and another end, and a composition divider being disposed on the other end of the prong, being screwed to the receiving body and preferably being screwed into the flow body.

In accordance with an additional feature of the invention, the composition divider has radially disposed webs, which are preferably rounded.

In accordance with yet another feature of the invention, the composition divider has a fastening for a cartridge from which a deformable composition can be expelled and forced into the interior of the receiving body.

In accordance with yet a further feature of the invention, the first and second angles of conicity differ by substantially 1 to 5° and preferably by substantially 4°.

In accordance with yet an added feature of the invention, the tapering interior of the receiving body has a narrowest point, and, in an installed state, the end portion of the flow body ends upstream, preferably substantially 1 mm upstream, of the narrowest point.

In accordance with yet an additional feature of the invention, the radially widening outlet chamber is located between the tapering interior and the outlet opening of the receiving body. In the extrusion, a slow relaxation of pressure of the plastic composition occurs in this process in the widening outlet chamber. As a result, the composition does not remain stuck in the outlet opening. Instead, a relatively smooth outer wall of the extruded profile is attained.

In accordance with again another feature of the invention, the interior of the receiving body has a cylindrical rear chamber.

In accordance with again a further feature of the invention, the flow body has a conically shaped rear part.

In accordance with again an added feature of the invention, the flow body and/or the receiving body are formed of a special steel.

In accordance with again an additional feature of the invention, the interior of the receiving body and/or the flow body are polished.

Especially uniform round holes or longitudinal conduits can be attained if, in accordance with still another feature of the invention, the flow body is rounded on the conical end that points toward the outlet opening when installed.

In accordance with still a further feature of the invention, the receiving body has a cylindrical outer surface.

In accordance with still an added feature of the invention, the first angle of conicity is approximately 40°.

In accordance with a concomitant feature of the invention, the extrusions are optical waveguide plug prongs or pins and/or optical waveguide sheaths.

Although the invention is illustrated and described herein as embodied in an apparatus for producing an material extrusion with a central opening, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
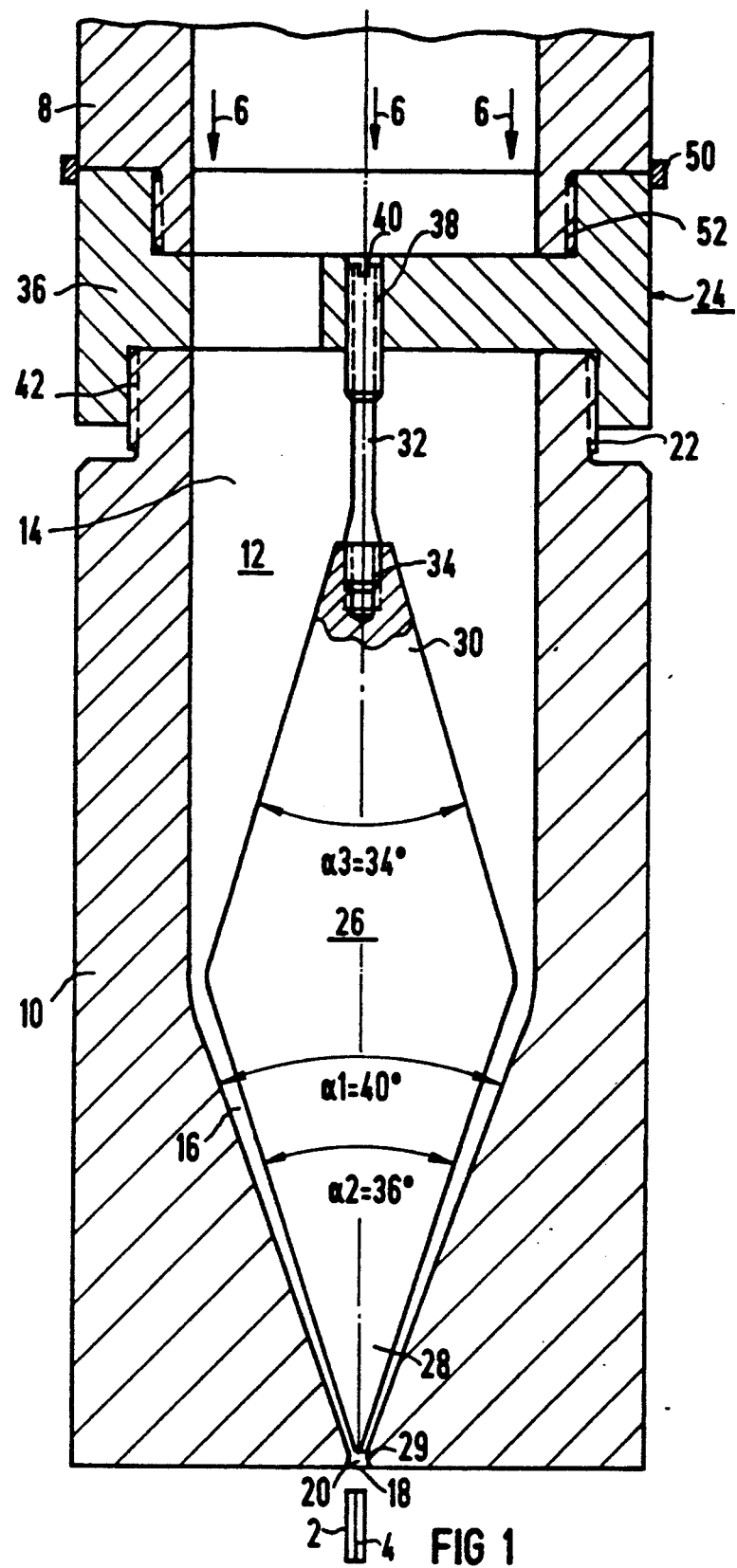
FIG. 1 is a fragmentary, diagrammatic, partly broken-away, sectional view of an apparatus for extrusion, having a receiving body, a flow body inserted into the interior thereof, and a retainer for the flow body.

DESCRIPTION OF THE PREFERRED EMBODIMENTS:

Referring now to the figures of the drawing in detail and first, particularly, to FIG. 1 thereof, there is seen an apparatus with which round material extrusions or billets 2 having a very narrow central opening or a very narrow central longitudinal conduit or channel 4, can be made. Good concentricity of the longitudinal conduit 4 is an important production goal. This conduit, for instance, has the aforementioned diameter of 80 to 100 $\mu$, and the outside diameter of the material extrusion 2 is approximately 2.5 mm. The material extrusion is made from a deformable or plastic composition 6, which is forced by a non-illustrated pressure ram out of a cartridge 8 into the apparatus in the direction of arrows at reference numeral 6, as shown. The composition 6 may, for instance, be a ceramic, such as zirconium oxide. After passing through the apparatus, the composition 6 is made to set, for example by being air-dried.

The apparatus includes a cylindrical receiving body 10, having a center with a continuous interior 12. This interior 12 includes a cylindrical rear chamber 14 and a front chamber 16, which tapers conically in the direction of an outlet opening 18 by a predetermined first angle of conicity $\alpha 1$. The angle of conicity $\alpha 1$ may, for instance, be $\alpha 1 = 40°$. The receiving body 10 is preferably produced from a special steel, such as $V_2A$ steel, and the interior surface of the interior 12 is preferably polished, so that a largely laminar flow of the plastic composition 6 is assured.

It is worth noting that the tapering front chamber 16 does not taper as far as the outlet opening 18. Instead, a radially widening outlet chamber 20 is provided between the tapering front chamber 16 and the outlet opening 18. As will become clear below, this outlet chamber 20 serves to provide a slow relaxation of pressure in the outflowing plastic composition 6. This makes it possible to achieve a relatively smooth outer wall of the extrusion or extruded profile 2.

The receiving body 10 has a rearward end with an external thread 22, on which a flow body 26 is firmly held in the interior 12, by a retainer that is generally identified by reference numeral 24.

The flow body 26 is likewise preferably made of a special steel such as $V_2A$ steel. The flow body 26 has a front end part 28 and a rear end part 30. The front end part 28 tapers in the direction of the outlet opening 18, by a predetermined second angle of conicity $\alpha 2$. This second angle of conicity $\alpha 2$ is smaller than the first angle of conicity $\alpha 1$. As a result, a narrowing flow path is created between the front chamber portion 16 and the end part 28. The flowable composition 6 flows along this path with increasing speed toward the outlet opening 18. The second angle of conicity $\alpha 2$ may, for instance, be 36°. In general, the difference $(\alpha 1 - \alpha 2)$ between the two angles of conicity $\alpha 1$, $\alpha 2$, is preferably 1 to 5°, depending on the application. In the present case, this difference is approximately 4°. The outer surface of the flow body 26 is also polished, in order to assure an easy laminar flow.

In this case, the rear part 30 of the flow body 26 is conically shaped and has a third angle of conicity $\alpha 3$ of 34°, for instance. A tip 29 of the end part 28 is somewhat rounded. In the installed state, the tip 29 is located just in front of the narrowest point of the tapering interior front chamber 16 of the receiving body 10. The spacing between the tip 29 and the outlet opening 18 defines the diameter of the longitudinal conduit 4. For the application in question in this case, that is for the manufacture of optical wave guide plug prongs or pins, the tip is located approximately 1 to 2 mm in front of the outlet opening 18.

The retainer 24 has two special features first, it is slightly resilient, so that the retained flow body 26 can be displaced somewhat in the radial direction of the interior 12; and second, it assures that the position of the flow body 26, as measured in the axial direction, can be adjusted relative to the receiving body 10.

Figure 2:
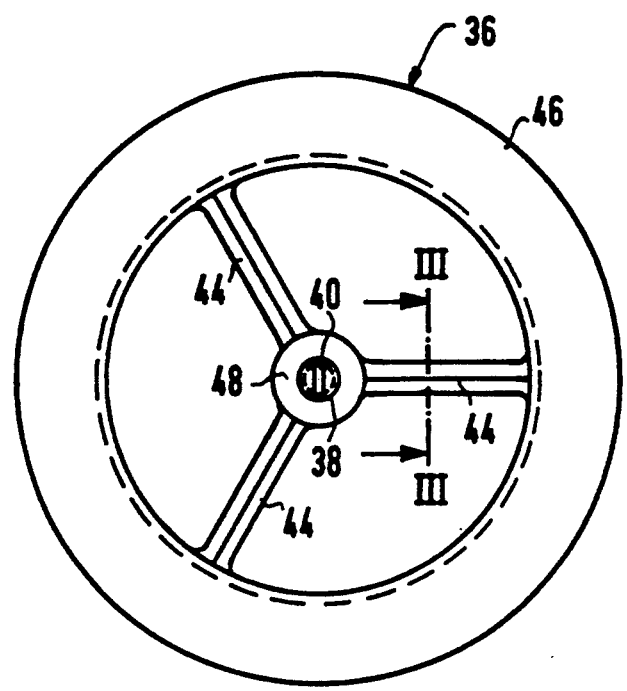
FIG. 2 is a top-plan view of a radial or star-shaped composition divider used in the retainer.

The resiliency in the radial direction is assured by a bar or prong 32, which may preferably be made of metal. This prong 32 is centrally and firmly screwed into the end of the conically shaped rear part 30 of the flow body 26. The screw fastening of one end of the prong 32 is indicated at reference numeral 34. The other end of the prong 32 is screwed into a central holder or composition divider 36 that allows the composition to pass through it. FIG. 2 is a plan view of this composition divider, splitter or distributor 36. The screw fastening between the prong 32 and the composition divider 36 is indicated at reference numeral 38 in FIG. 1. It can also be seen in FIG. 1 that the other end of the prong 32 has a slit 40. The axial height of the flow body 26 and thus the diameter of the longitudinal conduit 4 can be adjusted with a screwdriver inserted into the slit 40. A non-illustrated nut can be used for locking purposes. The composition divider 36 has an internal thread 42 at the bottom, with which it is screwed onto the external thread 22 of the receiving body 10.

Figure 3:
FIG. 3 is a sectional view of a rounded arm of the composition divider, taken along the line III—III of FIG. 2, in the direction of the arrows.

From FIG. 2 it can be seen that the composition divider 36 has three webs, arms or veins 44 disposed radially or in a star pattern. These webs 44 connect a cylindrical outer body 46 to a central hub 48 into which the prong 32 is screwed. The composition divider 36 is preferably likewise made of a metal, such as a special steel. From the cross-sectional view of FIG. 3, it can be seen that the webs 44 are preferably rounded, in order to enable an easy laminar flow.

The cartridge 8 is secured centrally on the composition divider 36. To this end, a fastener is provided, which is indicated in FIG. 1 in the form of a ring 50. A thread 52 may be used instead of or in addition to the ring.

It is also apparent that the deformable composition 6 flows in the direction of the arrows through the composition divider 36 due to the pressure of the cartridge ram and enters the interior 12 of the receiving body 10. Due to the flow body 26, the composition 6 is forced to the edge in this case, and it is pressed with increasing speed toward the outlet opening 18. Even in the case of pressure fluctuations, the flow body 26 tends to remain in a central position.

This is made possible by its slightly resilient suspension from the flexible prong 32. This makes the apparatus self-adjusting. In the region of the outlet opening 18 and in the chamber 20, a high flow speed at a low pressure prevails.

This is especially advantageous. The tip 29 of the conical front end part 28 rests at the point where the pressure is practically zero, which is, for instance, 3 mm in front of the outlet, but still in front of the narrowest point, or in other words before the outlet chamber 20.

As already described above, a homogeneous deformable composition 6 is used, such as a ceramic-like zirconium oxide. This composition can flow through the flow path described above largely unimpeded and is thus shaped into uniform extruded parts as well.

In summary, the following points may be made: The apparatus is constructed in such a way that good concentricity of the longitudinal conduit is attained because of the self-adjusting alignment of the flow body 26, resulting from its radially displaceable suspension. It is accordingly an important feature that the flow body 26 be radially moveably secured on the composition divider 36. The diameter of the longitudinal conduit 4 can be varied with infinite graduation by axially shifting the flow body 26 relative to the outlet chamber 20. The conduit diameter of approximately 100 $\mu$ that is required in optical wave guide plug prongs or pins is attained by means of the cone tip 29 having a radius of curvature of $\geq 0.2$ mm, for example. Slight pressure fluctuations in the composition 6 do not cause any shifting of the conical tip 29. In terms of their geometry and surface qualities, the flow body 26 and the outlet region 18, 20 are constructed in such a way that a laminar flow is attained over the entire cross section. Good flow behavior of the composition 6 is attained by means of the constant increase in speed and decrease in pressure toward the outlet opening 18.

We claim:

1. An apparatus for producing an extrusion with a central opening from a deformable composition, comprising:
    a) a receiving body having an outlet opening and having an interior tapering conically at a predetermined first angle of conicity toward said outlet opening;
    b) a flow body being inserted into said interior of said receiving body, said flow body having an end portion tapering conically at a predetermined second angle of conicity, said second angle of conicity being smaller than said first angle of conicity; and
    c) a retainer retaining said flow body in said interior of said receiving body, said retainer being resilient in a radial direction of said interior of said receiving body.

2. The apparatus according to claim 1, wherein said flow body is axially adjustable relative to said receiving body.

3. The apparatus according to claim 2, wherein said flow body is secured to said receiving body by at least one thread.

4. The apparatus according to claim 1, including a prong being surrounded by said retainer, said prong having a first end being screwed into said flow body and a second end and a composition divider being disposed on said second end of said prong and being screwed to said receiving body.

5. The apparatus according to claim 4, wherein said prong is made of metal.

6. The apparatus according to claim 4, wherein said prong is screwed into said composition divider.

7. The apparatus according to claim 4, wherein said composition divider has radially disposed webs.

8. The apparatus according to claim 7, wherein said webs are rounded.

9. The apparatus according to claim 4, wherein said composition divider has a fastening for a cartridge from which a deformable composition is expelled and forced into said interior of said receiving body.

10. The apparatus according to claim 1, wherein said first and second angles of conicity differ by substantially 1 to 5°.

11. The apparatus according to claim 1, wherein said first and second angles of conicity differ by substantially 4°.

12. The apparatus according to claim 1, wherein said tapering interior of said receiving body has a narrowest point, and, in an installed state, said end portion of said flow body ends upstream of said narrowest point.

13. The apparatus according to claim 8, wherein said end portion of said flow body ends substantially 1 mm upstream of said narrowest point.

14. The apparatus according to claim 1, wherein said receiving body has a radially widening outlet chamber between said tapering interior and said outlet opening.

15. The apparatus according to claim 1, wherein said interior of said receiving body has a cylindrical rear chamber.

16. The apparatus according to claim 1, wherein said flow body has a conically shaped rear part.

17. The apparatus according to claim 1, wherein at least one of said flow body and said receiving body are formed of a V2A steel.

18. The apparatus according to claim 1, wherein at least one of said interior of said receiving body and said flow body are polished.

19. The apparatus according to claim 1, wherein said conical end portion of said flow body is rounded and points toward said outlet opening upon installation.

20. The apparatus according to claim 1, wherein said receiving body has a cylindrical outer surface.

21. The apparatus according to claim 1, wherein said first angle of conicity is approximately 40°.

22. An apparatus for producing optical waveguide plug prongs and sheaths with a central opening from a deformable composition, comprising:
   a) a receiving body having an outlet opening and having an interior tapering conically at a predetermined first angle of conicity toward said outlet opening;
   b) a flow body being inserted into said interior of said receiving body, said flow body having an end portion tapering conically at a predetermined second angle of conicity, said second angle of conicity being smaller than said first angle of conicity; and
   c) a retainer retaining said flow body in said interior of said receiving body, said retainer being resilient in a radial direction of said interior of said receiving body.

* * * * *